US008149828B2

(12) United States Patent
Kalkunte et al.

(10) Patent No.: US 8,149,828 B2
(45) Date of Patent: Apr. 3, 2012

(54) SWITCH ASSEMBLY HAVING MULTIPLE BLADES IN A CHASSIS

(75) Inventors: Mohan Kalkunte, Sunnyvale, CA (US); Shekhar Ambe, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 11 days.

(21) Appl. No.: 12/292,207

(22) Filed: Nov. 13, 2008

(65) Prior Publication Data

US 2009/0074001 A1    Mar. 19, 2009

Related U.S. Application Data

(63) Continuation of application No. 09/956,020, filed on Sep. 20, 2001, now Pat. No. 7,466,704.

(60) Provisional application No. 60/234,171, filed on Sep. 20, 2000.

(51) Int. Cl.
  *H04L 12/56* (2006.01)
(52) U.S. Cl. ...................................... 370/389
(58) Field of Classification Search .................. 370/360, 370/389, 392, 419; 710/100
  See application file for complete search history.

(56) References Cited

U.S. PATENT DOCUMENTS

| | | | |
|---|---|---|---|
| 5,473,598 A | 12/1995 | Takatori et al. | |
| 5,530,302 A | 6/1996 | Hamre et al. | |
| 5,953,314 A | 9/1999 | Ganmukhi et al. | |
| 5,987,008 A | 11/1999 | Simpson et al. | |
| 5,991,295 A | 11/1999 | Tout et al. | |
| 6,041,117 A | 3/2000 | Androski et al. | |
| 6,314,096 B1 | 11/2001 | Tanabe et al. | |
| 6,628,659 B1 | 9/2003 | Park | |
| 6,639,910 B1 | 10/2003 | Provencher et al. | |
| 6,690,668 B1 * | 2/2004 | Szczepanek et al. | 370/392 |
| 6,728,807 B1 * | 4/2004 | Laursen | 710/100 |
| 6,868,082 B1 * | 3/2005 | Allen et al. | 370/360 |
| 6,888,794 B1 | 5/2005 | Jovanovic et al. | |
| 6,985,431 B1 * | 1/2006 | Bass et al. | 1/1 |
| 7,003,603 B2 * | 2/2006 | Laursen | 710/100 |
| 7,206,283 B2 | 4/2007 | Chang et al. | |
| 7,466,704 B2 * | 12/2008 | Kalkunte et al. | 370/392 |
| 2004/0213224 A1 | 10/2004 | Goudreau | |

FOREIGN PATENT DOCUMENTS

| | | |
|---|---|---|
| EP | 0 731 581 A2 | 9/1996 |
| EP | 0 752 668 A1 | 1/1997 |
| EP | 0 785 699 A2 | 7/1997 |

* cited by examiner

*Primary Examiner* — Man Phan
*Assistant Examiner* — Kevin Lee

(57) ABSTRACT

Methods and apparatus for network communications are disclosed. In an example embodiment, a network switch assembly for network communications comprises a fabric blade. In the example embodiment, the at least one switch comprises a plurality of data port interfaces, where the plurality of data port interfaces are configured to transmit and receive data over a plurality of fabric data ports. The at least one switch of the fabric blade also includes a central processing unit (CPU) interface configured to communicate with an external CPU subsystem. The example network switch assembly also includes a plurality of port blades. Each port blade of the plurality of port blades includes a local CPU and at least one switch. In the example network switch assembly, the at least one switch of each port blade includes a plurality of data port interfaces, where the plurality of data port interfaces being configured to transmit and receive data over a plurality of port data ports. The at least one switch of each port blade in the example network switch assembly also includes a local CPU interface configured to communicate with the local CPU.

10 Claims, 2 Drawing Sheets

SWITCH ASSEMBLY HAVING MULTIPLE BLADES IN A CHASSIS

CROSS REFERENCE TO RELATED APPLICATIONS

This is a continuation application of U.S. patent application Ser. No. 09/956,020, filed on Sep. 20, 2001, now U.S. Pat. No. 7,466,704, which claims priority of U.S. Provisional Patent Application No. 60/234,171, filed on Sep. 20, 2000. The subject matter of the earlier filed applications are hereby incorporated by reference.

BACKGROUND OF THE INVENTION

1. Field of the Invention

The invention relates to a switch assembly having multiple blades in a chassis and a method of using that assembly to switch data. In particular, the invention relates to configurations having five and nine blades to provide the requisite switching capacity.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (0%) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to Ethernet, are hardware-based devices which control the flow of data packets or cells based upon destination address information which is available in each packet. A properly designed and implemented switch should be capable of receiving a packet and switching the packet to an appropriate output port at what is referred to as wirespeed or linespeed, which is the maximum speed capability of the particular network.

Basic Ethernet wirespeed is up to 10 megabits per second, and Fast Ethernet is up to 100 megabits per second. The newest Ethernet is referred to as 10,000 Mbitsls Ethernet, and is capable of transmitting data over a network at a rate of up to 10,000 megabits per second. As speed has increased, design constraints and design requirements have become more and more complex with respect to following appropriate design and protocol rules and providing a low cost, commercially viable solution. For example, in environments where data switching is needed, multiple switches are combined into a switch assembly capable of switching much more data than a single switch.

In the most general terms, a chassis is a frame or box like sheet metal support for mounting the components of an electronic device. In switching applications, the mounted components are referred to as blades. The blades have electronic devices mounted thereon and the chassis architecture allows blades to be swapped out depending on the needs of the switching environment.

In prior art systems, the configurations do not allow for the throughput required for data switching now and in the future. Therefore, there is a need for a switch assembly that allows for multiple configurations, that allows for blades to be "hot swappable" and that allows for data handling and switching at the wirespeeds discussed above.

SUMMARY OF THE INVENTION

The present invention is directed to a switch assembly, capable of using Ethernet, Fast Ethernet, 1 Gigabit and 10,000 Mbits/s Ethernet systems, where that assembly is formed by a plurality of blades in a chassis, wherein all of the blades communicate with each other to achieve the desired throughput. The present invention is also directed to methods employed to achieve the desired processing and forwarding of data, where the data is handled by the switch assembly.

The invention is therefore directed to a network switch assembly for network communications, that includes at least one fabric blade and a plurality of port blades. The at least one fabric blade has at least one switch having a plurality of data port interfaces, supporting a plurality of fabric data ports transmitting and receiving data, and a CPU interface, where CPU interface is configured to communicate with a CPU. The at least one fabric blade also has a CPU subsystem communicating with the CPU interface. Each of said plurality of port blades has at least one switch having a plurality of data port interfaces, supporting a plurality of port data ports transmitting and receiving data. The plurality of port data ports communicate with the plurality of fabric data ports along multiple paths such that data received by the port data ports is switched to a destination port of the network switch assembly along a specified path of the multiple paths based on a portion of the received data.

In other embodiments, each of the plurality of port blades further includes a local CPU and the at least one switch of the plurality of port blades includes a local CPU interface configured to communicate with the local CPU. Additionally, in other embodiments, the number of port blades can be four or eight port blades depending on the configurations of the network environment.

In other embodiments, the at least one fabric blade has at least two switches, with each switch having the plurality of fabric data ports transmitting and receiving data. Additionally, the at least two switches communicate with the CPU subsystem to provide address synchronization between the at least two switches. Also, the port blades are hot swappable, such that they can be swapped out without powering down the switch assembly.

The invention is also directed to a method of handling data in a network switch assembly, with the method including the step of receiving an incoming data packet into an input queue of a port data port of a port blade. A portion of the incoming data packet is examined to determine a destination address for the incoming packet. A determination of whether the incoming packet should be forwarded to a switch on a fabric blade is made based on the determined destination address. The packet is then discarded, forwarded, or modified based upon the examining and determining steps. Lastly, the switch of the fabric blade processes the data packet when forwarded to the switch of the fabric blade such that the data packet is forwarded to a particular port associated with the destination address.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

The present invention is directed to an application involving a plurality of chips providing a low cost chassis solution which would have a many port blades and a fabric blade. The switch assembly receives data on ports of the port blades and directs the data received based on address information within a portion of the data. The fabric blade communicates with each of the port blades and allows intercommunication between the port blades.

Figure 1:
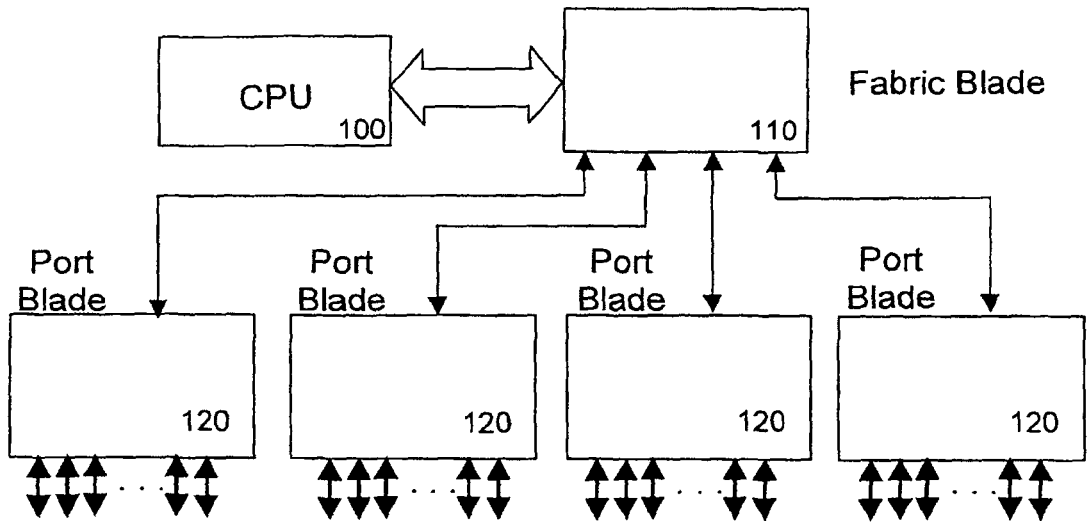
FIG. 1 is a block diagram of elements of one embodiment of the present invention having five blades.

FIG. 1 shows a schematic configuration of a five blade chassis. In a basic embodiment, the fabric blade 110 is directly connected to a Central Processing Unit (CPU) 100, as illustrated in FIG. 1. The port blades 120 are connected to the fabric blade through a stacking link of the port blades. Each of the port blades has a plurality of ports that are used to receive and send data. While the port blades have some memory and processing ability, it is necessary for the CPU 100 to process Bridge Protocol Data Unit (BPDU) lookups and all management traffic is sent to the CPU 100 on the fabric blade.

Each blade has a switch on chip (SOC) included thereon. The type of chip included with the blade depends on the type of application and the volume of data that a switch assembly needs to process. In a preferred embodiment, the chip may be an eight port gigabit switch capable of switching packet data at linespeeds compliant with Ethernet, Fast Ethernet and 10,000 Mbits/s Ethernet.

Figure 2:
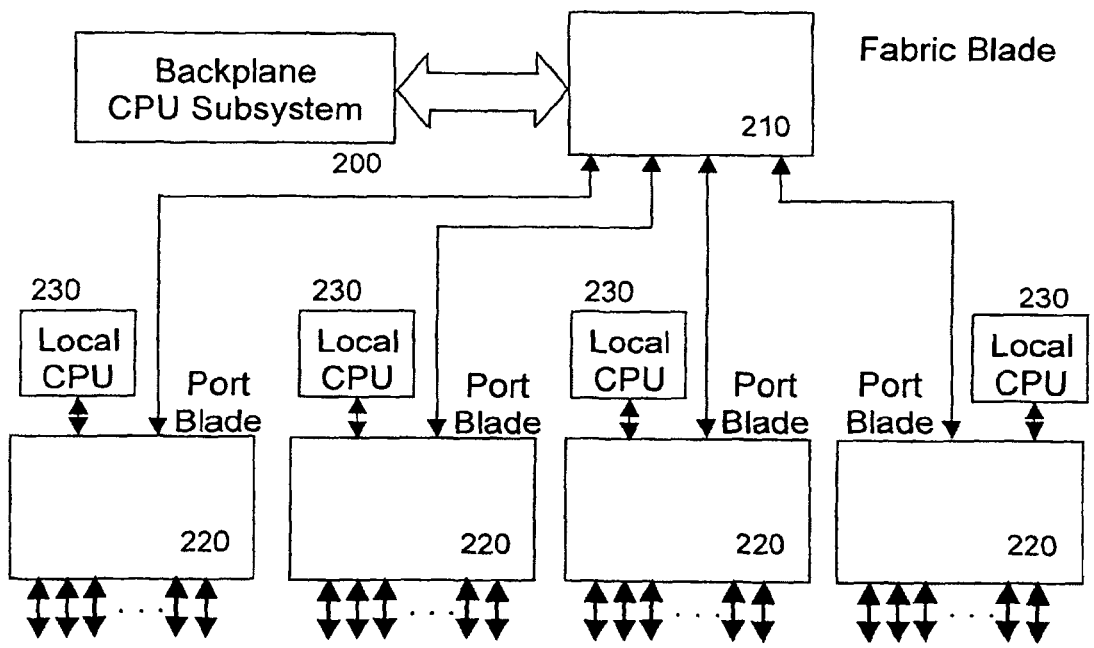
FIG. 2 is block diagram of elements of another embodiment of the present invention having five blades.

In another embodiment, the present invention provides for one fabric blade and 4 port blades, as illustrated in FIG. 2. The fabric blade contains the backplane CPU subsystem 200 and a switch on chip 210 for interconnecting with all port blades. Port blade 220 contains a SOC and one local CPU subsystem 230 for initialization and register access. Each port blade is hot swappable. In one embodiment, a gigabit bandwidth is provided by connecting one Gigabit-port between each fabric blade and the port blade. In such an embodiment, all the interconnecting Gigabit-ports would be set as stacking, ports that will enable link aggregation across the blades.

In one embodiment, each port blade has 24 10/100 ports or 6 Gig-ports and is hot swappable. For networking environments having less throughput, 24 10/100 ports may be provided on the front panel and a 1 Gig-port for stacking with the fabric blade is used for each port blade. For greater throughputs, 6 Gigports can be provided on the front panel and a 1 Gig-port for stacking with the fabric blade. External hot swap circuitry is used to support the hot swap capacity for the port blades.

The single CPU on the fabric blade is used to provide management functions for the switch assembly. In a preferred embodiment, a high capacity switch on chip and a PC1 2.1 compliant CPU subsystem is used to form the fabric blade. In the embodiment illustrated in FIG. 2, one local CPU is provided on each port blade for initialization and accessing the internal registers and tables of the SOC. The local CPU will read the remote monitoring (RMON) counters from the switch fabric on each port blade and pass the information to the fabric blade. The local CPU also handles the BPDU packets to resolve the spanning tree on the network.

The switch assembly also provides spanning tree support. When a BPDU arrives at one of the ports in the port blade, the BPDU will be sent to the local CPU. The local CPU will receive BPDUs and resolve the Spanning tree state on each port. This provides for faster resolution and processing. The switch assembly also provides for trunking within and across the port blades. Trunking occurs when ports are linked together to form a "fat pipe" to relieve congestion in this critical area of a network. In a preferred embodiment, only one Gig-port of the switch fabric on each port blade is configured as the stacking link for connecting to the fabric blade and other ports may be used to allow trunking within and across the port blade. The configuration also allows for mirroring of ports across the port blades.

Figure 3:
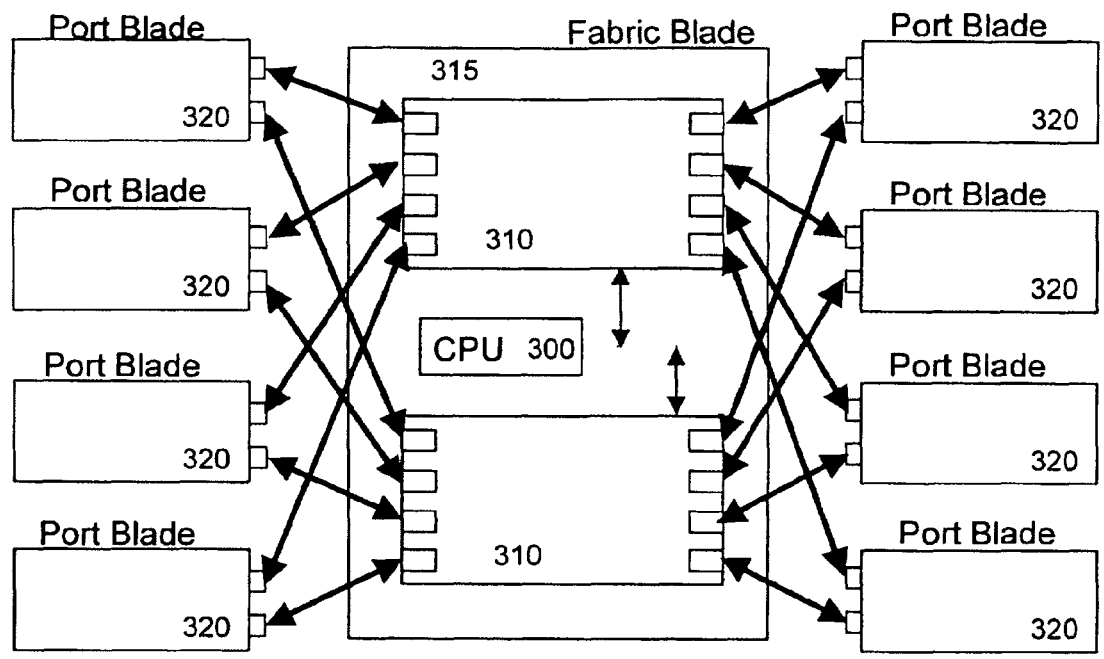
FIG. 3 is a block diagram of elements of another embodiment of the present invention having nine blades.

Another embodiment of the present invention is illustrated in FIG. 3. The switch assembly illustrated in FIG. 3 contains one fabric blade 315 and 8 port blades 320. The fabric blade contains the backplane CPU subsystem 300 and two SOCs 310 for interconnecting with all of the port blades. Each port blade contains a SOC and one local CPU subsystem for initialization, register access and BPDU handling. Each port blade is hot swappable. The port blades are interconnected to the fabric blade using at least two ports. In a preferred embodiment, the two ports connecting to the fabric blade are two Gigabit-ports.

Figure 4:
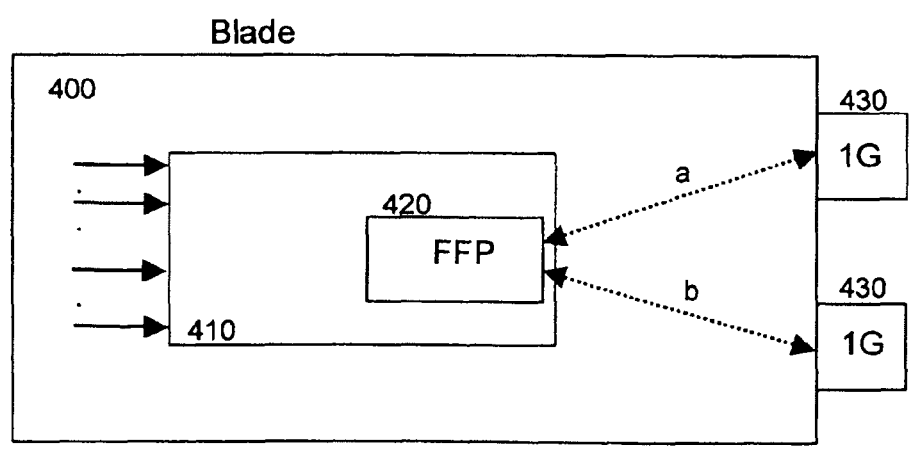
FIG. 4 is a block diagram illustrating the steering of data to ports of the port blade in the embodiment illustrated in FIG. 3.

Also in this preferred embodiment, all the interconnecting Gig-ports of the port blades are set as stacking links so that data can be transferred correctly. As illustrated in FIG. 4, the Fast Filtering Processor (FFP) 420 of the SOC 410 will steer a portion of the traffic to each of the interconnecting Gig-ports 430. In addition, the PTABLE and the VTABLE of the SOCs should be programmed approximately for the VLAN membership of the stacking links. This will enable link aggregation of the ports within and across the blades.

One important aspect of the switch assembly of the present invention concerns the flow of data within the port blade. This is illustrated in FIG. 4 where traffic is steered to the fabric blade along one of two paths, i.e. one of the Gigabit ports 430. The FFP steers the traffic by evaluating each packet to determine if it is a unicast, broadcast, multicast or unknown unicast packet. Multiple VLAN tables are used for the different types of packets. This process allows the fabric blade to efficiently handle the flow of traffic through the switch assembly.

As discussed above for the five blade solution, the nine blade switch assembly has port blades that are hot swappable. Each port blade has a SOC with 24 10/100 ports or 6 Gig-ports. For some embodiments, the port blades have 24 10/100 ports on the front panel and two Gig-ports for stacking with the fabric blade. In other embodiments, 6 Gig-ports (on the front panel) and two Gig-ports (for stacking with the fabric blade) are provided. As discussed above, external hot swap circuitry is used to support the hot swap capacity for the port blades. Also, it is noted that the SOC included with the port blades can be mixed in terms of speed; thus, the ports of the port blade that communicate with the fabric blade could be both a Gig-port and a TurboGig-port, as long as the SOCs included with the fabric port have at least 4 Gig-ports and 4 TurboGig-ports.

Also as discussed with respect to the five blade switch assembly, a single CPU on the fabric blade provides management functions and assists in ARL learning. The CPU on the fabric blade must assist the ARL learning to provide the synchronization between the two SOCs 310 on the fabric blade. The CPU does the learning of the source address when data arrives in one of the SOCs 310, and the source address is learned on both the SOCs. This is necessary because the traffic between two ports may have different paths in each direction.

One local CPU on each port blade is used for initialization and accessing the internal registers and tables of the SOCs of the port blades. Also the local CPU will read the RMON counters from the switch fabric on each port blade and pass the information to the fabric blade. The localCPU will also handle the BPDU packets to resolve the spanning tree on the network.

Trunking within and across the port blades is also possible with the nine blade solution illustrated in FIG. 3. All the interconnections will be configured as the stacking links for connecting between the fabric blade and the port blades. The FFP 420, FIG. 4, is used to steer one half of the traffic to each Gig-port between the fabric blade and the port blades. This allows trunking within and across the blades. Additionally, ingress mirroring is also supported, as discussed above with respect to the five blade solution.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

We claim:

1. A network switch assembly for network communications, said network switch assembly comprising:
 a fabric blade comprising:
  at least two switches, each switch of the at least two switches comprising a respective plurality of data port interfaces, each respective plurality of data port interfaces being configured to transmit and receive data over a respective plurality of fabric data ports;
  a central processing unit (CPU) interface configured to communicate with an external CPU subsystem; and
 a plurality of port blades, each port blade of the plurality of port blades being operationally coupled with each of the at least two switches, wherein each port blade of the plurality of port blades comprises:
  a local CPU;
  at least one switch comprising:
   a plurality of data port interfaces, the plurality of data port interfaces being configured to transmit and receive data over a plurality of port data ports; and
   a local CPU interface configured to communicate with the local CPU, wherein the plurality of port data ports of each of the plurality of port blades are configured to communicate with the plurality of fabric data ports along multiple paths such that data received by the port data ports is switched to the fabric blade along a respective specified path of the multiple paths based on a portion of the received data.

2. The network switch assembly of claim 1, wherein the plurality of port blades comprises four port blades.

3. The network switch assembly of claim 1, wherein the plurality of port blades comprises eight port blades.

4. The network switch assembly of claim 1, wherein the at least two switches are configured to communicate, via the CPU interface, with the CPU subsystem to provide address synchronization between the at least two switches.

5. The network switch assembly of claim 1, wherein each port blade is configured to be hot swappable.

6. A method of handling data packets in a network switch assembly, the method comprising:
 receiving an incoming data packet into an input queue of a port data port of a port blade;
 examining a portion of the incoming data packet to determine a destination address for the incoming packet;
 determining whether the incoming data packet should be forwarded to a switch of at least two switches of a fabric blade based on the determined destination address, wherein each of the at least two switches is operationally coupled with the port blade and configured to:
  transmit and receive data over a plurality of fabric data ports; and
  communicate with an external CPU subsystem; and
 determining, based on the portion of the incoming data packet, which path of a multiple number of paths between the port blade and the fabric blade the incoming packet should be forwarded along,
 wherein the switch of the at least two switches processes the data packet, when forwarded to the switch of the at least two switches, such that the data packet is forwarded to a particular port associated with the destination address, and
 wherein determining whether the incoming packet should be forwarded to the switch of the at least two switches based on the determined destination address comprises forwarding the incoming packet to a particular port of the port blade, the particular port blade communicating with the fabric blade and operating at a particular data rate based on the destination address.

7. The method of claim 6, further comprising discarding, forwarding, or modifying the packet based upon the examining and determining steps.

8. The method of claim 6, wherein examining the portion of the incoming data packet to determine the destination address for the incoming packet comprises communicating with a local CPU to determine a proper handling of the incoming data packet.

9. An apparatus for handling data packets in a network switch assembly, the apparatus comprising:
 receiving means for receiving an incoming data packet into an input queue of a port data port of a port blade;
 examining means for examining a portion of the incoming data packet to determine a destination address for the incoming packet;
 determining means for determining whether the incoming data packet should be forwarded to a switch of at least two switches of a fabric blade based on the determined destination address, wherein each of the at least two switches is operationally coupled with the port blade and configured to:
  transmit and receive data over a plurality of fabric data ports; and
  communicate with an external CPU subsystem; and
 determining means for determining, based on the portion of the incoming data packet, which path of a multiple number of paths between the port blade and the fabric blade the incoming packet should be forwarded along,
 wherein said switch of the at least two switches processes the data packet when forwarded to the switch of the at least two switches such that the data packet is forwarded to a particular port associated with the destination address, and
 wherein determining whether the incoming packet should be forwarded to the switch of the at least two switches based on the determined destination address comprises forwarding the incoming packet to a particular port of the port blade, the particular port blade communicating with the fabric blade and operating at a particular data rate based on the destination address.

10. The apparatus of claim 9, further comprising means for discarding, forwarding, or modifying the packet based upon the examining and determining steps.

* * * * *